July 18, 1967　　　M. L. PERRY ET AL　　　3,331,131
GLASS REMOVING TOOL
Filed March 12, 1965
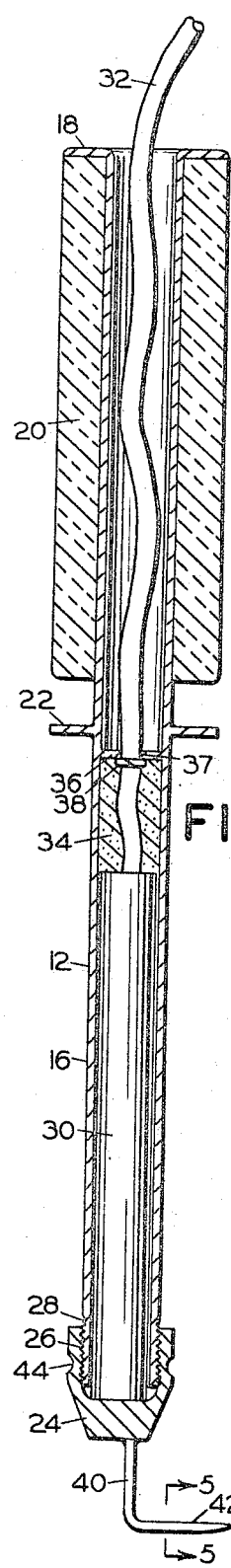
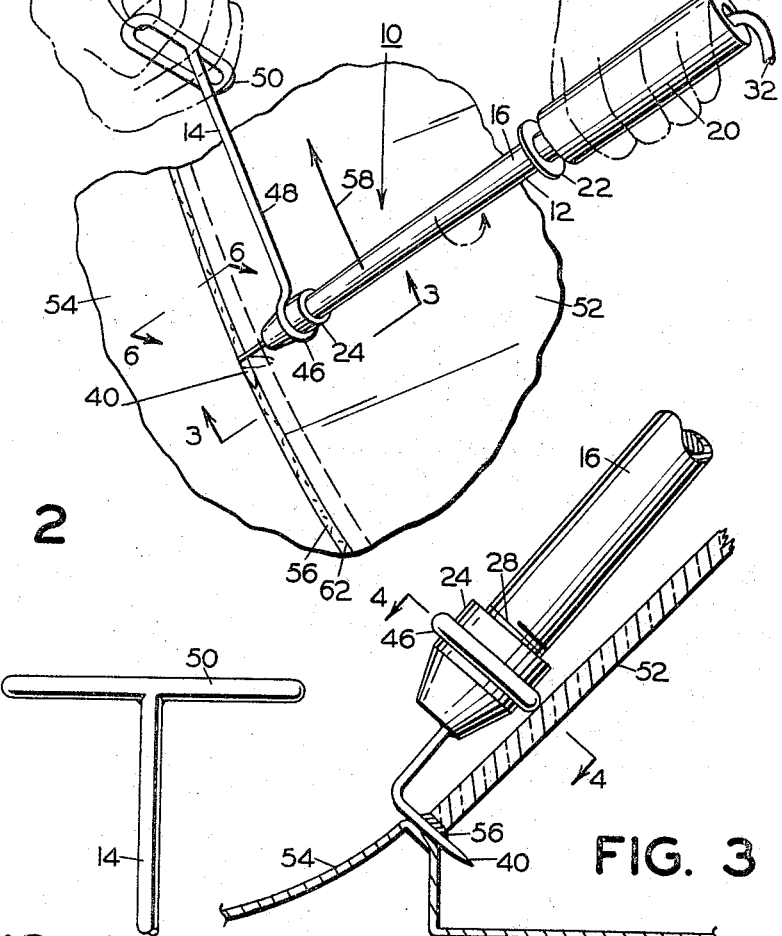
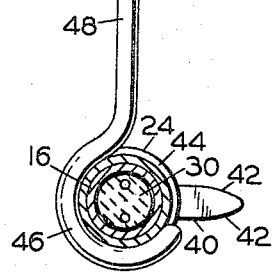
INVENTORS.
MARVIN L. PERRY
JAMES S. NICHOLAS
BY *Loyal H. McCarthy*
ATTORNEY

United States Patent Office 3,331,131
Patented July 18, 1967

3,331,131
GLASS REMOVING TOOL
Marvin L. Perry, P.O. Box 154, Agate Beach, Oreg. 97320, and James S. Nicholas, South Beach, Oreg. 97366
Filed Mar. 12, 1965, Ser. No. 439,314
4 Claims. (Cl. 30—140)

ABSTRACT OF THE DISCLOSURE

A sealant cutting tool comprising a handle connected to a body, a heat shield disposed ahead of said handle, a tool base connected to said body, an angular cutting blade held by said tool base, heating means disposed within said body, and pulling means connected to said tool base.

Rubber gaskets are no longer used for mounting the windshields of many cars and are being eliminated in other areas of the modern automobile, other vehicles and structures. The sealant is taking its place and must necessarily form a tough, impervious surface with the adjacent portions of the vehicle if it is to effectively repel water and retain the particular window in place. Consequently, the task of removing a windshield or fixed window is much more difficult than it was in the days when rubber gaskets were employed entirely. Thus, our invention relates to a heated cutting tool which may be effectively operated by one person to remove windshields and other windows mounted by the sealant method which sets up and becomes tough and flexible. Sealant is now used in all types of vehicles, conveyances and structures. Windows so mounted must be cut out for removal purposes. There is presently available for this purpose, to our knowledge, only a cold knife, which has to be forced into the sealant between the glass and its framework, or a piano wire, one end of which has to be forced through the sealant. The piano wire method requires two men, one on each side of the windshield, who must pull and saw with the wire to cut the sealant. The cold knife method is difficult and time consuming. In either of these methods the glass being removed, such as a re-usable windshield, is left with a very uneven and rough edge, making it difficult to re-install in another vehicle. With our improved glass removing tool, the knife being heated, one man is able to remove a fixed window from its opening quickly and without assistance from any other person. It also leaves a smooth cut rendering a removed window more readily installed in another vehicle. Furthermore, experience has shown that the use of our improved glass removing tool enables effective re-installation of the removed windshield with only one half tube of sealant, whereast present methods require a full tube of sealant to reinstall the windshield removed thereby.

It is, therefore, one of the objects of our invention to provide a glass removing tool for sealant mounted windows and windshields which is capable of being effectively operated by one person.

It is another object of our invention to provide a glass removing tool which has been heated by self-contained heating means for the purpose of obtaining a smoother and faster cut during the removal operation.

It is a further object of our invention to provide a glass removing tool which has a more rigid and durable blade and which will give longer, efficient service than the existing cold-knife blades.

Still another and further object of our invention is to provide a glass removing tool which, due to its smooth cut, will not require the use of as much sealant to re-install the removed windshield in another vehicle as is required by presently known methods and means.

It is still another and further object of our invention to provide a glass removing tool which will save time in the removal and installation of windshields mounted by the sealant method.

It is another, further and additional object of our invention to provide a glass cutting tool which is strong and capable of standing the pressures and heat applied in removing a sealed window.

Other and further objects of our invention will be apparent from the specification, drawings, and claims hereinafter set forth.

Referring to the drawings:

FIG. 1 is a fragmentary, perspective view of our improved glass removing tool being positioned to remove a windshield, the broken lines showing the tool blade in cutting attitude.

FIG. 2 is a longitudinal, cross-sectional view through the center line of our improved glass removing tool, showing the handle, a tubular body, the heat shield, the powdered, asbestos packing, the electrical heating element, the conducting wire attached thereto and the removable knife blade.

FIG. 3 is a fragmentary, side elevational view of our glass removing tool in position during the operation of removing a window set with the sealant on its edges taken along line 3—3 of FIG. 1 in the direction of the arrows.

FIG. 4 is a top, cross-sectional view of the blade end and pulling element of our glass removing tool taken along line 4—4 of FIG. 3 in the direction of the arrows FIG. 5 is an end, cross-sectional view of the knife blade on an enlarged scale taken along line 5—5 of FIG. 2 in the direction of the arrows.

FIG. 6 is a detailed, fragmentary view of an enlarged scale, showing the tool blade inserted for positioning to cut sealant from the ordinary flanged window opening, the broken lines showing the tool blade rotated into cutting attitude, taken along the line 6—6 of FIG. 1.

Our glass removing tool 10 consists of a body 16, preferably made from tubular stock, open at both ends with the handle end being provided with a flange 18 which may be integral with said body, having a diameter greater than that of the body 16. A handle 20 formed from some tough, heat resistant material such as Bakelite circumscribes the body 16 forwardly of flange 18 and is secured to said body by means of molding, fastening devices, or any other suitable means. A circumscribing heat shield 22, which may be integral with the body 16, is positioned forwardly of the handle 20 in spaced relation thereto. At the forward, or cutting tool, end of the body 16 an end cap, or tool base, 24 is threadedly engaged with the body 16. Threads 26 are provided at the inner surface of the end cap, or tool base, 24. A baffle 36 is positioned medially of the interior of body 16 and is provided with a hole 37 therethrough to accommodate the electric conductor cord 32. Said cord 32 is provided with a clip, or stop, 38, secured thereto forwardly of baffle 36, which prevents the cord from being pulled beyond a predetermined point. The electric, conductor cord 32 may be attached to any suitable source of electricity at one end. A heating element 30, preferably imbedded in ceramic material, is shaped to be complementary to the inner diameter of the body 16 and is connected at its rearmost end to the other end of said electrical conductor cord 32. The heating element 30 is maintained in spaced relation to the baffle 36 of body 16 by means of powdered asbestos, or other suitable insulating material, 34, of sufficient quantity to dispose the forward end of said heating element even with, or projecting slightly beyond, the threaded end 28 of body 16. When the end cap, or tool base, 24 is securely threaded into position on the body of the tool, the heating element is brought into snug engagement with the inner surface thereof at its forward end and with the insulation 34 between its opposite end and baffle 36. The tool base 24 also has an exterior, peripheral groove 44 disposed medially of its length and is preferably made of brass. A cutting tool blade 40 of tough, rigid material, such as a good quality tool steel, spring steel, or other suitable material, is integral with, or securely attached to, the outer or extreme end of tool base 24. It is preferably L-shaped but may be straight, curved or of any other desirable configuration, and is provided with sharp, cutting edges 42.

A pulling arm 14 is provided with a shank 48 formed into a hook 46 at one end and provided with a handle 50 at its other end. The hook 46 is complementary to and removably engageable with groove 44 of tool base 24. It is pivotal upon said tool base, when engaged, so as to be conveniently operable for any position the operator may require during cutting, whether he be left- or right-handed.

In operation our device, after having had its electrical conductor cord 32 plugged into the source of electricity and having been heated, is grasped by its handle 20 with one hand. Its pulling arm 14 is grasped by its handle 50 with the other hand and engaged at its hook 46 with the peripheral groove 44 of the tool base 24. The sharp, cutting edge portions 42 of the blade 40 are then forced through the sealant 56 which secures windshield 52 to opening 54. In the type of window opening having a flange 60 to seat against the surface of windshield 52 the L-shaped blade 40 is inserted into the gap 62 between the edges of the opening and the windshield in a relatively perpendicular position with the horizontal leg of said blade aligned with the course of said gap 62. Then, by rotating handle 20 through approximately 90 degrees sharp edge 42 of the horizontal leg of blade 40 cuts through sealant 56 in a plane parallel to and between the surfaces of windshield 52 and the adjacent flange 60. See FIGS. 1, 3 and 6 of the drawings. The tool 10 is then pulled around the peripheral margin of the windshield or glass to be removed, such as in the direction of arrow 58, by exerting pressure on the handle 50 of pulling arm 14 and the handle 20 of the tool. The blade and its cutting edges, having been preheated by means of an electrical conductor cord 32 and the ceramic heating element 30 within the heater portion 12 of the tool body 16, softens the sealant 56 as it cuts the same, thus enabling one man quickly and effectively to remove a window or windshield and in the same operation to leave a smooth and regular edge on the glass and its opening for easier re-installation, both of the glass and in the opening.

The tool will usually be operated from the exterior of the vehicle and the glass to be removed but may, in certain cases, be operated from the interior thereof. Furthermore, the pivotal connection between the pulling arm 14 at its hook 46 with the tool base 24 makes the tool as readily usable by a left-handed as by a right-handed person. This feature, further, enables cutting in either direction around windshield 52 or other window as the requirements of the particular job may make most desirable.

It is to be understood that the pulling arm 14 may be so formed that its hook element 46 cannot be removed from the groove 44 of tool base 24. However, it is deemed more preferable to have the pulling arm 14 removably engageable with tool base 24 to facilitate the replacement of tool base 24 or its blade 40 in the event the same requires sharpening or becomes damaged beyond usability. It is also to be understood that the pulling arm 14 may be secured in a fixed position to the tool body or tool base of our sealant cutting tool. It is to be further understood that many variations of our invention are feasible without departing from the scope and spirit thereof and that the embodiment disclosed herein is merely a presently preferred form of said invention.

Having thus describe our invention, we claim:

1. A glass sealant cutting tool comprising a hollow base open at the ends, having a flange at one end thereof and threads at the other end thereof, a baffle medially of the interior of said base, said baffle being provided with an opening therethrough, a heat shield circumscribing said base medially thereof, a handle secured to said base in spaced relation to said heat shield, extending to said flange, an electrical heating element disposed within said base forwardly of said baffle, an electrical conductor attached to said heating element, disposed through said opening in said baffle and extended beyond said flange of said base, stopping means secured to said electrical conductor forwardly of said baffle, said means being larger than the opening through said baffle, powdered asbestos insulation disposed between said baffle and said electrical heating element interiorly of said base, a tool base complementarily threaded at its inner surface, engageable with said threaded end of said base and having an exterior, peripheral groove disposed medially of its length, an L-shaped cutting tool blade disposed from its outer end, and a pulling arm provided with a handle at one end and a hook at the other end, said hook being detachably and pivotally engaged with said peripheral groove on said tool base.

2. A sealant cutting tool comprising a hollow, tubular body, having a flange at one end thereof and a tool base detachably disposed at the other end thereof, a rigid, L-shaped cutting blade extending longitudinally from said tool base, an electrical heating element disposed within said tubular body and adjacent to said tool base, a baffle interiorly of said tubular body in spaced relation to said heater element, said baffle being provided with an opening therethrough, an electrical conductor, extending through said tubular body and the opening in said baffle, and connecting to said electrical heating element, a stop element on said electrical conductor between said heating element and said baffle, insulation disposed interiorly of said tubular body between said baffle and said heating element, a handle secured to the exterior surface of said tubular base, a heat shield on said tubular base, spaced forwardly of said handle, and a pulling arm detachably and pivotally engageable with said tool base.

3. A sealant cutting tool comprising a body, holding means secured to said body, cutting means disposed on said body, heating means connected to said body and contacting said cutting means, and pulling means pivotally connected to said tool and disposed near said cutting means and rotatable about the longitudinal axis of said body.

4. A sealant cutting tool of the character described in claim 3 in which said pulling means is releasably secured to said cutting tool.

References Cited

UNITED STATES PATENTS

| 2,056,951 | 10/1936 | Bohall et al. | 219—227 X |
| 2,254,974 | 9/1941 | Olson et al. | 30—140 |
| 2,568,012 | 9/1951 | Boeuf | 30—312 X |
| 2,574,440 | 11/1951 | Smith et al. | 219—238 X |
| 2,600,067 | 6/1952 | Merodian | 30—314 |

FOREIGN PATENTS 551,265 2/1943 Great Britain.

WILLIAM FELDMAN, *Primary Examiner.*

G. WEIDENFELD, *Assistant Examiner.*